United States Patent [19]

Konishi

[11] 3,742,335

[45] June 26, 1973

[54] WAVEGUIDE COMPONENT COMPRISING NON-LINEAR ELEMENTS

[75] Inventor: Yoshihiro Konishi, Sagamihara, Japan

[73] Assignee: Nippon Hoso Kyokai, Tokyo, Japan

[22] Filed: Apr. 7, 1972

[21] Appl. No.: 242,167

[30] Foreign Application Priority Data

Apr. 28, 1971 Japan ............................... 46/28334

[52] U.S. Cl. ............................... 321/69 W, 325/446

[51] Int. Cl. ........................... H02m 5/20, H03h 7/02

[58] Field of Search ..................... 321/69 W, 69 NL; 325/446; 307/88.3; 333/73 S, 81

[56] References Cited

UNITED STATES PATENTS

| | | | |
|---|---|---|---|
| 3,621,367 | 11/1971 | Rosen et al. | 321/69 W |
| 3,378,690 | 4/1968 | Dodson | 307/88.3 |
| 3,437,935 | 4/1969 | Webb | 325/446 |

OTHER PUBLICATIONS

Electronics, Feb. 7, 1966, Pages 72–83, Authors – Dangl & Steele

Electronics, June 10, 1968, Pages 100–108, Author – Moroney

*Primary Examiner*—Gerald Goldberg
*Attorney*—Richard K. Stevens, Rozer L. Hansel et al.

[57] ABSTRACT

A waveguide component for use in microwave range or in quasi-millimeter wave range such as, for instance, a frequency multiplier or a frequency down converter. The waveguide component comprises a strip line element functioning as an antenna for resonating at least two electromagnetic waves having different frequencies and a semiconductor element of which one end is connected to the strip line. Both the strip line and the semiconductor element are provided onto a dielectric base plate by means of printing circuit technique. The dielectric base plate is mounted in a waveguide in a manner that the strip line element extends parallel to a high frequency electric field in the waveguide. The waveguide component having above construction is able to be miniaturized by the elimination of the conventional tuning circuit elements and due to its improved semiconductor mounting it is suitable to be used in quasi-millimeter wave range.

6 Claims, 16 Drawing Figures

WAVEGUIDE COMPONENT COMPRISING NON-LINEAR ELEMENTS

BACKGROUND OF THE INVENTION

1. Field of the Invention

The present invention relates to a waveguide component such as a frequency multiplier or a frequency down converter to be used in microwave range and upto quasi-millimeter wave range.

2. Description of the Prior Art 1

When two kind of signals having the frequencies $f_1$ and $f_2$ are supplied to a waveguide component including a non-linear semiconductor element, generally frequency components $nf_1 \pm mf_2$ are produced, wherein $n$ and $m$ are positive integers.

Conventional frequency down converter or frequency multiplier for use in the microwave range comprises waveguide resonant circuits for resonating more than two desired frequency components among said plurality of frequency components produced by the non-linear characteristic of the non-linear semiconductor element inserted in the waveguide component.

FIG. 1 shows side cross-sectional view of such a conventional frequency down converter. FIG. 2 shows front cross-sectional view of one of such conventional frequency multipliers.

As shown in these figures, the semiconductor element is supported by mens of projecting post members or the like in the waveguide. In the example shown in FIG. 1, the semiconductor element 1 is supported by a lead element 5 and posts 4 and 4' at the input output OUTPUT boundary portion 2 of the waveguide. In this embodiment, the input waveguide extends upper side from the boundary portion 2 and the output waveguide extends lower side from said portion 2. In the embodiment shown in FIG. 2 the semiconductor element is supported by posts 4 and 4' and secured by means of an insulator 6 at the location in the waveguide. In the embodiment shown in FIG. 2, an input signal is applied through the input waveguide 7 and a desired output signal having desired frequency component can be derived fron an output waveguide 3. In FIG. 1, 8 is a terminal for supplying a bias voltage and a pump signal for the semiconductor element 1. In FIG. 2, 9 is a filter for blocking the high frequencies and 10 is a coaxial tuner.

The abovementioned waveguide components of the conventional type have disadvantages in that the circuit loss is comparatively large due to conductor loss at the coupling portion of the semiconductor element 1 and the respective tuning circuit and that the construction is too complicated to realize miniaturization of the component. Furthermore, the conventional construction has means such as posts and insulators for mounting the semiconductor element so that an application in quasi-millimeter wave had been impossible owing to the mechanical unstability.

SUMMARY OF THE INVENTION

The present invention has for its object to mitigate above disadvantages of the conventional waveguide components and more particularly, to realize a waveguide component for use in frequency conversion or frequency multiplication of microwave by using non-linear characteristics of a semiconductor element in which abovementioned disadvantages are solved. The waveguide component according to the present invention has a construction to eliminate the aforementioned tuning circuits and is suitably used in quasi-millimeter wave range.

In order to realize above object the waveguide component according to the present invention comprises at least one strip line functioning as an antenna for at least two electromagnetic waves and a semiconductor element of which one end is connected to said strip line, wherein the strip line and the semiconductor element are provided on a dielectric base plate by means of printing circuit technique and the dielectric base plate is so mounted in a waveguide that the strip line extends parallel to the high frequency electric field in the waveguide.

When the waveguide component according to the invention is used for a frequency down converter, another end of said semiconductor element is connected to a center conductor of a coaxial terminal. Said strip line is so arranged as to respond to an input signal $f_s$ and a pump signal $f_p$ and said input and pump signals $f_s$ and $f_p$ are supplied to the component from both sides of the waveguide, and an output intermediate frequency can be obtained at the output coaxial terminal.

When the waveguide component is used for a frequency multiplier, a fundamental wave $f_1$ is received by the strip line having the antenna function, and a desired harmonic component $f_3$ produced by the non-linear characteristics of the semiconductor element may be radiated from said strip line to an output waveguide.

According to the present invention the strip line is given a function as a receiving antenna and also as a transmitting antenna for a desired number of frequency components. Therefore, a plurality of tuning circuits used in the conventional component can be replaced only by a simple strip line so that the component has much simple construction. Furthermore, the semiconductor element and the strip line can be applied onto a dielectric base plate by printing. Accordingly, the component according to the invention has advantages in that it is suitable for mass-production, that the semiconductor element is rigidly fixed and hence it is given high mechanical strength and that since there is no construction to embed the semiconductor element in an insulating material the component can well be used in the quasi-millimeter wave range and also it has very low circuit loss.

If the component according to the invention is used as a frequency down converter and if there are a number of high level input signals, a plurality of combinations of the strip line and the semiconductor element are provided on a same dielectric base plate in order to prevent intermodulation by the non-linear characteristics of semiconductor element and to decrease the high frequency input applied to each semiconductor element. In the same manner, a frequency multiplier may be formed by inserting a plurality of combinations of a strip line and a semiconductor element in order to avoid limitation of a high input level of the fundamental wave per one semiconductor element.

Figures 1, 2, 3A, 3B, 4, 5:
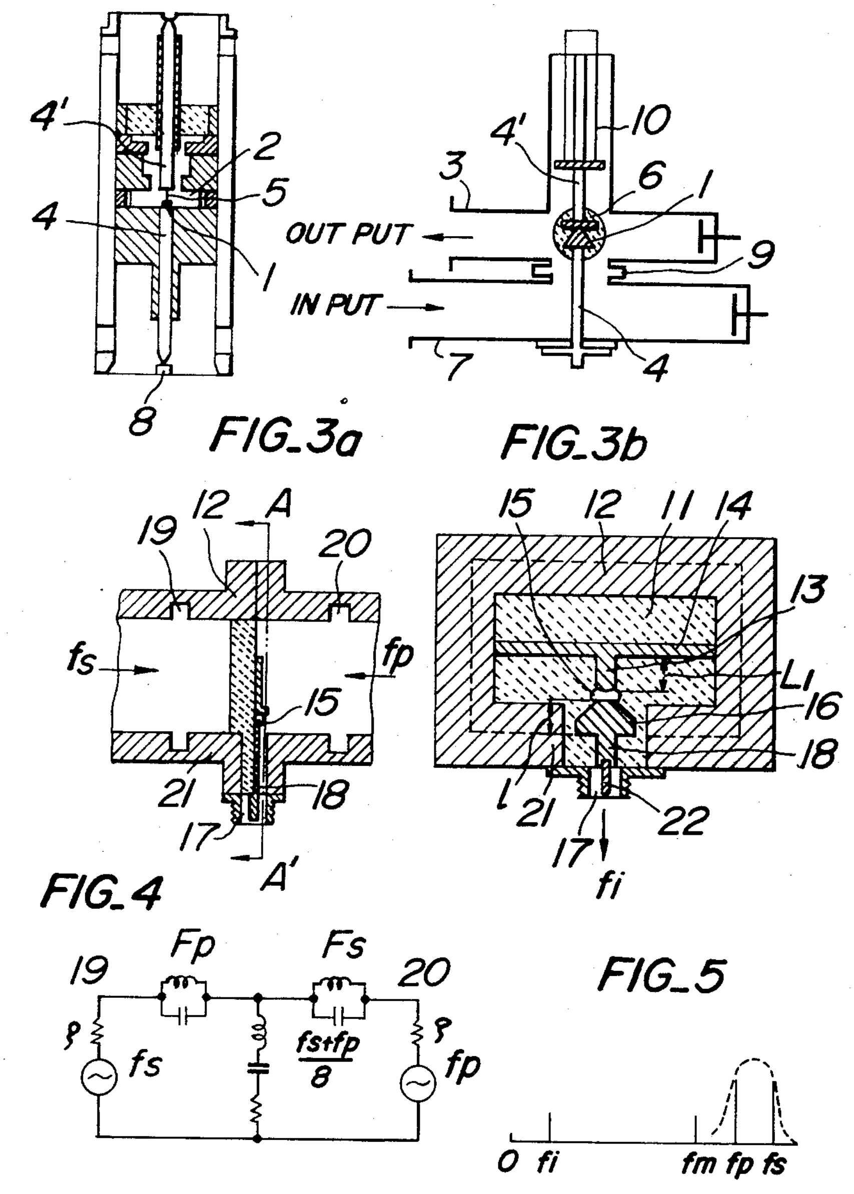
FIG 1 (PRIOR ART)
FIG 2 (PRIOR ART)
FIG. 1 is a side cross-sectional view of a conventional frequency down converter.
FIG. 2 is a schematic view showing construction of a conventional frequency multiplier.

FIG. *3a* is a cross-sectional view of a frequency down converter made in accordance with the present invention viewed from E surface of a waveguide;

FIG. 3*b* is a cross-sectional view along line A—A' of FIG. 3*a;*

Figure 6:
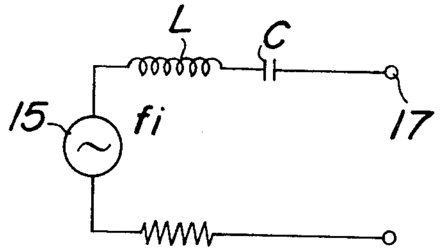
Figure 7A:
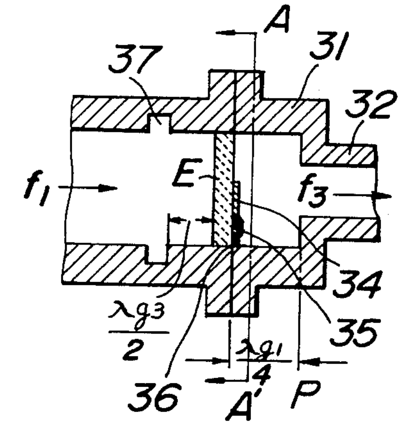
Figure 7B:
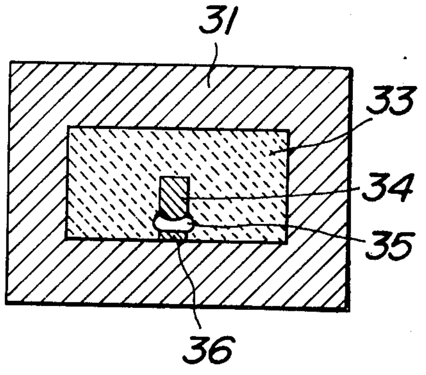

FIG. 4 is an equivalent diagram of the frequency down converter shown in FIGS. 3*a* and 3*b* with respect to the signal frequency $f_s$ and the pump frequency $f_p$;

FIG. 5 is radiation characteristics diagram for explaining the operation of the strip line as an antenna of the frequency down converter as shown in FIG. 3;

FIG. 6 is an equivalent diagram of the frequency down converter shown in FIG. 3 with respect to the intermediate frequency component $f_i$;

FIG. 7*a* is a cross-sectional view of an embodiment of the frequency multiplier made in accordance with the present invention viewed from E surface of the waveguide;

FIG. 7*b* is a cross-sectional view along line A—A' of FIG. 7*a;*

Figure 8A:
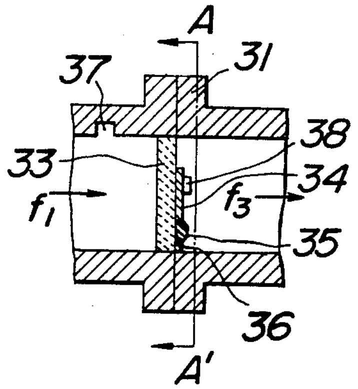
Figure 8B:
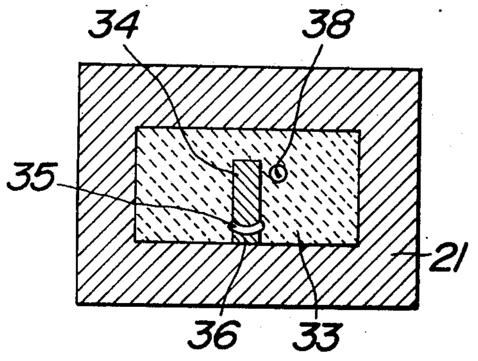

FIG. 8*a* is a cross-sectional view of an embodiment of the frequency multiplier of the present invention equipped with an idler tuning means, viewed from E surface of the waveguide;

FIG. 8*b* is a cross-sectional view along line A—A' of FIG. 8*a;*

Figure 9:
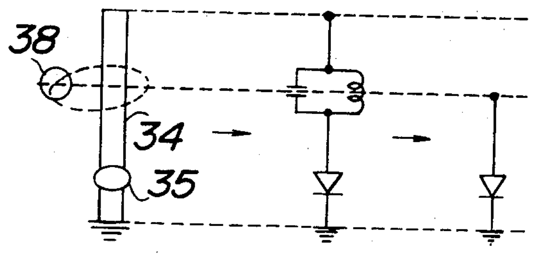
Figure 10B:
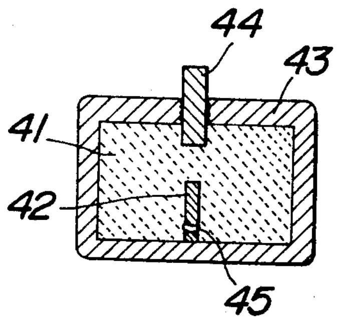
Figure 10A:
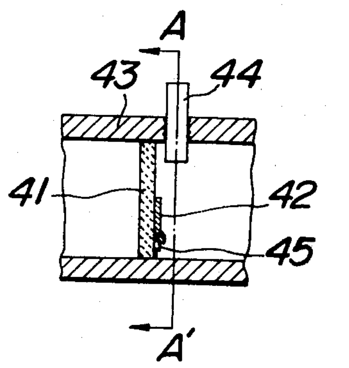

FIG. 9 is an equivalent diagram for explaining operation of the idler tuning mechanism in the embodiment shown in FIG. 8;

FIG. 10*a* is a cross-sectional view showing one alternative embodiment of the present invention viewed from the E surface of the waveguide;

FIG. 10*b* is a cross-sectional view of the waveguide viewed from line A—A' in FIG. 10*a;*

Figure 11:
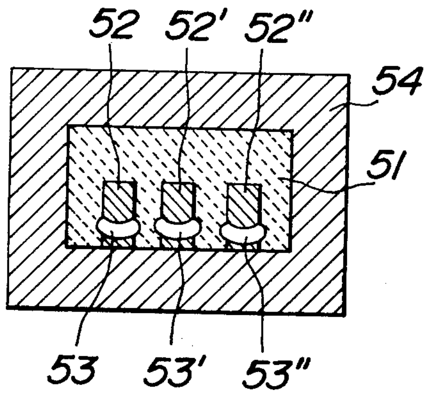
Figure 12:
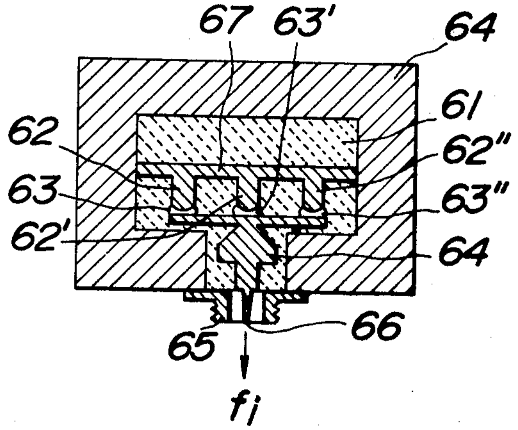

FIG. 11 shows a more practical embodiment of a frequency down converter of the present invention, in which a number of strip lines each having antenna function are provided; and FIG. 12 shows a further embodiment of a frequency multiplier of the present invention equipped with a plurality of strip lines each having the antenna function.

DESCRIPTION OF THE PREFERRED EMBODIMENTS

The invention will be explained in more detail with referring to the embodiments shown in the accompanied drawings.

A typical embodiment of a frequency down converter made in accordance with the present invention is shown in FIGS. 3*a* and 3*b*. FIG. 3*a* is a cross-sectional view of the frequency down converter viewed from E surface of a waveguide 12. FIG. 3*b* is a front view of the frequency down converter viewed from lateral cross-section of the waveguide 12. In the FIGS. 3*a* and 3*b*, 11 is a dielectric base plate mounted in the waveguide 12 to extend laterally to close the entire cross-section of the waveguide 12. As shown more clearly in FIG. 3*b*, a strip line 13 having its length $L_1$ is applied for instance by vaporization onto the dielectric base plate 11. The strip line 13 has a function of an antenna and its length $L_1$ is chosen to be nearly equal to one-fourth of mean value of respective wave length $\lambda_s$ and $\lambda_p$ of an input signal having frequency $f_s$ and a pump signal having frequency $f_p$. Namely the length $L_1$ is chosen to be nearly equal to $(\lambda_s+\lambda_p)⅛$. Upper end of the strip line 13 is connected to other strip line 14 extending parallel to H surface of the waveguide 12. The strip line 13 may also be applied onto the dielectric base plate 11 for instance by vaporization. The two strip lines 13 and 14 can be applied simultaneously and as a whole constitutes a T type strip line. The both ends of the strip line 14 are connected to the both side surfaces of the waveguide 12, i.e. to the E surfaces of the waveguide 12 and are arranged to be kept at the same potential with said E surfaces. Lower end of the strip line 13 is connected to one end of a Schottky barrier diode 15. The other end of this Schottky barrier diode 15 is connected to one end of a strip line 16 constituting a center conductor of a coaxial terminal which will be explained more detail hereinafter. The length $l$ of the strip line 16 is settled to be nearly equal to $(\lambda_s+\lambda_p)⅛$ or equal to $L_1$ as shown in FIG. 3*b*. The width of the strip line 16 is broadened as shown in the figure in order to decrease its characteristic impedance. The lower end of the strip line 16 is connected to a connecting portion 18 to a center conductor of a coaxial terminal 17. The width of the portion 18 is made substantially same as that of the strip line 13. A signal power having its frequency $f_s$ is supplied to the waveguide for instance from the left side of FIG. 3*a* as shown by an arrow. A pump power having its frequency $f_p$ is applied to the waveguide from the right side of the down converter element as shown in FIG. 3*a* also as shown by an arrow. At the signal input side of the waveguide 12 there is provided an inner groove 19 working as a choke for blocking the pump frequency component $f_p$ and at the pump input side there is provided an inner groove 20 working as a choke for blocking the signal frequency component $f_s$.

In the frequency down converter made in accordance with the present invention having abovementioned construction, the strip line 13 formed on the dielectric base plate 11 and having the length L may operate as an antenna for both the input signal frequency $f_s$ and the pump signal frequench $f_p$. The radiation characteristics of this antenna formed by the strip line 13 are as shown by a dotted line in FIG. 5. In FIG. 5, $f_m$ is an image signal of the pump signal having its frequency $f_p$.

An equivalent circuit diagram of the waveguide equipped with the frequency down converter is as shown in FIG. 4. As shown in the equivalent circuit diagram, the converter corresponds to a series resonant circuit having its center frequency $(f_s+f_p)⅛$ is connected in parallel to the waveguide. If the signal power and the pump power having the frequencies $f_s$ and $f_p$, respectively, are applied to the waveguide from both left and right sides of the converter element, almost all of these signal and pump powers are trapped by the strip line 13 and thus flow through the Schottky diode. In this case, the signal power may hardly leak to the right side or to the pump signal input side of the waveguide 12 by the trapping function of the strip line 13 and by the function of the choke 20. In the same manner the pump signal power having frequency $f_p$ may hardly leak to the left side or signal input side of the waveguide 12 by the trapping function of the strip line 13 and the choke 19.

A resultant intermediate frequency $f_i$ having its relation with the frequencies $f_s$ and $f_p$ as shown in FIG. 5 is produced in the Schottky diode 15. This intermediate frequency $f_i$ is derived from the coaxial terminal 17 through an equivalent series circuit of an inductance and a capacitance, of which equivalent circuit diagram is shown in FIG. 6. The inductance L in the equivalent diagram of FIG. 6 is mainly formed by a resultant inductance of the strip lines 13 and 14 and an inductance of the waveguide portion 21. The inductance of the center conductor portions 16 and 18 can be neglected in view of the low frequency $f_i$. The capacitance C in the FIG. 6 is formed by the oppositely arranged waveguide portion 21 and the strip line 16 having a wider width. In this case since the strip line portion 16 for deriving the intermediate frequency component $f_i$ is given a wider width so that the characteristic impedance $W_C$ is comparatively low and in an order of about 1Ω. Whereas the center conductor portion 18 of the coaxial terminal 17 is given a narrower width so that the characteristic impedance $W_D$ is comparatively high and is in an order of about 50Ω. Under this condition, an impedance with respect to the intermediate frequency component $f_i$ viewed from an input side of the wider width strip line 16 to the coaxial terminal 17 side becomes very low owing to the following reason. The deriving circuit of the intermediate frequency component $f_i$ is formed by a coupling of a low characteristic impedance line 16 and a high impedance line portion 18. Accordingly, viewed from the input side of the strip line 16, the strip line 16 is approximately equal to open ended for the intermediate component $f_i$. Thus the component $f_i$ is derived from terminal 17 without substantial attenuation. On the other hand, the length of the strip line 16 is selected to be $(\lambda_s+\lambda_p)1/8$ as mentioned above. Whereas there exists a relation $(\lambda_s+\lambda_p)1/8 \cong (\lambda_s\approx\lambda_p)1/8$; so that for the signal and pump components $f_s$ and $f_p$, the impedance viewed from input of the deriving circuit of the component $f_i$ becomes very low, i.e. $(W_C^2/W_D = 1/50\Omega)$, which is nearly equal to shortcircuited. Due to this low impedance, the components $f_s$ and $f_p$ are practically not transmitted to the coaxial terminal 17. It may be considered that the wider width strip line portion 16 and the waveguide portion 21 constitute an earth for the components $f_s$ and $f_p$. In other words it may be assumed that the lower side of the Schottky diode 15 is shortcircuited for the high frequency and therefore the signal power ($f_s$) and the pump power ($f_p$) do not appear or leak to the coaxial terminal 17.

As explained in the foregoing, a strip line 14 having end portions shortcircuited to the side walls of the waveguide 12 is connected at the upper end of the strip line 13 functioning as an antenna. By arranging the length of the strip line 14 to be equal to $(\lambda_s\approx\lambda_p)3/4$, it is possible to make the upper end of the strip line 13 to be opencircuited for the components $f_s$ and $f_p$ and to be shortcircuited for the intermediate frequency component $f_i$.

In the waveguide component according to the present invention having abovementioned construction and functions, major part of the signal power ($f_s$) and the pump power ($f_p$) flow to the Schottky diode 15, and only the intermediate frequency component $f_i$ produced in the Schottky diode flows through the coaxial terminal 17, so that the intermediate frequency component $f_i$ can separately be derived from the coaxial terminal 17. The strip line 13 functioning as an antenna is given a narrower width so that loaded "Q" of the antenna becomes high. By arranging the strip line antenna 13 to resonate only with the frequency range shown by the dotted line in FIG. 5 including signal and pump components $f_s$ and $f_p$ and not to resonate with the image signal frequency $f_m$, the loss for the image signal frequency $f_m$ becomes very low. As the signal energy is not converted to the image signal energy, the conversion efficiency of the frequency down converter according to the invention can be made very high.

The depth $h_s$ and $h_p$ of the grooves of the chokes 20 and 19 provided in the waveguide in order to prevent leakage of signal and pump powers from the opposite side of the waveguide may be chosen to be nearly equal to $\lambda_s/4$ and $\lambda_p/4$, respectively. The distance of the choke grooves 20 and 19 from the strip line 13 functioning as the antenna may be chosen to be $\lambda_s/2$ and $\lambda_p/2$, respectively. By the above-mentioned arrangement, the impedance for the signal or pump component $f_s$ or $f_p$ viewed from the strip line 13 to the respective input side can be made high. It is also possible to reflect the signal or pump component $f_s$ or $f_p$ by the choke 20 or 19 to return to the strip line 13 to make further contribution to the output power.

A practical embodiment of the present invention experimentally manufactured with the abovementioned construction shows a conversion loss of 3.5dB in a quasi-millimeter wave band. This shows a considerable improvement if compared with the conversion loss of 5dB to 8dB in the frequency down converter having conventional construction. Also it shows a noise index of 5.3dB at the noise index of the intermediate frequency $f_i$ of 1.5dB. This also shows a remarkable improvement over the conventional frequency down converter which has its noise index from 6.5dB at the conversion loss of 5dB to 10dB at the conversion loss of 8dB.

FIGS. 7a and 7b show a practical embodiments in which the present invention is applied to a frequency multiplier. The illustrated embodiment is a case of obtaining three times frequency $f_3$ ($=3f_1$) of a fundamental frequency $f_1$. As shown in FIG. 7a, a waveguide 32 passing only the third harmonic wave $f_3$ ($=3f_1$) is connected at the output side, the right side in the figure, of a waveguide 31 passing the input fundamental wave having frequency $f_1$. The coupling surface is denoted by P in the FIG. 7a. A dielectric base plate 33 is provided in the waveguide 31 extending laterally against the direction of propagation. Onto the dielectric base plate 33 a strip line 34 is applied for instance by vaporization. The strip line 34 functions as an antenna for both the two waves $f_1$ and $f_3$. The dielectric base plate 33 is so arranged in the waveguide 31 that the strip line 34 is spaced apart from the P surface in a distance corresponding to $\lambda_g1/4$, wherein $\lambda_g1$ is the wavelength of the fundamental wave $f_1$ in the waveguide 31. The length of the strip line 34 is made nearly equal to $\lambda_1/4$, wherein $\lambda_1$ is a wavelength of the fundamental wave in the dielectric base plate. At the lower end of the strip line 34 an end of a semiconductor element 35 for the multiplication is connected. Another end of the semiconductor element 35 is connected to the bottom H surface of the waveguide 31 by means of a short strip line 36. In this embodiment, since there is no need to derive an intermediate frequency $f_i$, the strip line portion 14 shown in FIG. 3 is not required. In this frequency multiplier component, as the distance between the strip line 34 and the P surface is $\lambda_g1/4$ so that if the waveguide portion 32 constitutes a cut-off waveguide for a frequency component having its wavelength $\lambda_g1/4$, it can equivalently be assumed for the fundamental frequency component $f_1$ that a shortcircuit line is provided after a line having length corresponding to one-fourth wavelength. Accordingly, the position of the strip line 34 is regarded as opencircuited and an electric field of the fundamental wave $f_1$ is concentrated at the strip line 34. In the abovementioned construction of the frequency multiplier component, said distance between the strip line 34 and the P surface corresponds to $\lambda_g 2/2$ for the second harmonics $f_2$, wherein $\lambda_g 2$ is the wavelength in the waveguide 31 of the second harmonics $f_2$. Accordingly, the location of the strip line 34 corresponds to shortcircuited for the second harmonics $f_2$ so that there is no conversion component from the fundamental wave $f_1$ to the second harmonics $f_2$. As shown in the FIG. 7*a*, a choke 37 for preventing propagation of the third harmonics $f_3$ to the input of the fundamental wave $f_1$ produced in the semiconductor element 35, is provided in the waveguide 31 at a distance of about $\lambda_g 3/2$ from the strip line 34, wherein $\lambda_g 3$ is the wavelength of the third harmonics $f_3$ in the waveguide 31. In the frequency multiplier component made in accordance with the present invention, the third harmonics $f_3$ produced in the semiconductor element 35 is radiated from the strip line 34 to the output side, i.e. to the right side in the figure and transmitted to the output waveguide 32 with a high efficiency. In the embodiment of the present invention further improvement of the conversion efficiency can be obtained since an energy conversion to the second harmonics $f_2$ is not effected.

In the abovementioned frequency down converter or frequency multiplier, it is often required to add a resonant circuit for preventing a leakage of the idler frequency component for obtaining further improvement of the conversion efficiency. The idler frequency is the image frequency $f_m$ in case of the frequency down converter and is equal to a value $f_p-f_i$, and in case of a three times frequency multiplier it is equal to a value of $3f_1-f_1=2f_1$.

FIG. 8 is an embodiment of a frequency multiplier such as shown in FIG. 7 equipped with said resonant circuit. In this embodiment as is more clearly shown in FIG. 8*b*, a dielectric resonator 38 tuning to the idler frequency, which is in this case $f_2=2f_1$, is provided beside the strip line 34 having the antenna function and applied onto the dielectric base plate. The dielectric resonator 38 is made adjustable to move its position along the strip line 34. As shown in the equivalent circuit diagram of FIG. 9, the dielectric resonator 38 functions as a parallel resonating circuit for the strip line 34. Therefore the whole circuit can be regarded just same as a trapping circuit component is inserted in the strip line 34. Namely by suitably adjusting the position of the dielectric resonator 38, the strip line 34 is equivalently cut-off for the idler frequency ($2f_1$ in this case) and it loses the antenna function. In such an embodiment the strip line 34 can be assumed not to exist for the fundamental wave $f_1$ so that the strip line 34 may be made in a length to resonate both the fundamental wave $f_1$ and the third harmonics $f_3$. The dielectric resonator 38 may be formed by a dielectric material having high dielectric constant.

As can be understood clearly by the foregoing explanation, the waveguide component according to the present invention can realize a very good coupling between the waveguide and the strip line having the antenna function and between strip line and the semiconductor element provided on a dielectric base plate. Also only strip lines are connected to the semiconductor element provided on the dielectric base plate so that the circuit loss is very small. The abovementioned strip lines and the semiconductor element applied onto the dielectric base plate may be manufactured as a whose by a very simple manner by using the known integrating circuit technique used in the conventional microwave technical field. Also the assembly of the total element is very simple since the whole circuits are provided on one dielectric base plate by printing circuit technique and thereafter it may be mounted in the waveguide and fixed therein. Also in the present invention as the semiconductor element is formed by a printing circuit technique, the construction is very rigid and no particular means for supporting the semiconductor element onto an insulating material are required hence the component can well be used even in quasi-millimeter wave range.

The present invention is not limited in the aforementioned embodiment only and various modifications are possible without departing from the scope of the present invention. For instance, FIG. 10 shows one modified embodiment, in which a conductor rod or a dielectric rod 44 penetrating the wall of the waveguide 43 is provided at a location against top of a strip line 42 having the antenna function and provided on a dielectric base plate 41. In this embodiment by adjusting the interval between the end of the rod 44 and the top of the strip line 42, the effective length of the strip line 42 as the antenna may be adjusted to tune to a desired frequency component. In the above embodiment 45 is a semiconductor element.

The dielectric base plate to be used in the present invention may be preferably be made of a material having its dielectric constant equivalent to that of air such as for instance, by beryllia, etc.

FIGS. 11 and 12 show modified embodiments in which a plurality of strip lines each having the antenna function are provided on a dielectric base plate. The embodiment shown in FIG. 11 is a modified embodiment of a frequency multiplier previously explained with referrring to FIG. 7. In the embodiment shown in FIG. 7 using single diode the multiplied output power is limited due to saturation of the semiconductor element if the input level of the fundamental wave $f_1$ is too high. FIG. 11 shows an embodiment to mitigate such limitation, in which a plurality of strip lines 52, 52′, 52″, each having an antenna function for at least two electromagnetic waves are provided onto a same dielectric base plate 51 and a corresponding number of the semiconductor elements 53, 53′, 53″ are provided by connecting one terminal to the end of respective strip line and the other terminals are connected to the wall of waveguide via respective short strip lines 55, 55′, 55″. The above elements are all provided on one dielectric base plate 51 by printing circuit and the plate 51 is inserted in the waveguide 54 in a manner such that the direction of the strip lines 52, 52′, 52″ extends parallel to the high frequency electric field in the waveguide.

According to such modified embodiment of the present invention each semiconductor element 52, 52′, 52″ shares input energy having fundamental frequency $f_1$ so that the saturation of each semiconductor element can be avoided and a high power multiplied output can be obtained.

FIG. 12 shows a modified embodiment of a frequency down converter shown in FIG. 3. In a frequency down converter if a number of signals having a large input level are applied at the input side an intermodulation of the waves may occur due to non-linear characteristics of the semiconductor element. In order to prevent such intermodulation a plurality of strip lines 62, 62′, 62″, each having the antenna function and semiconductor element 63, 63′, 63″ having one terminal connected to the strip line respectively and a wider width strip line 64 for connecting the other ends of the semiconductor elements are provided onto a same dielectric base plate 61, and also a strip line center conductor 66 for deriving the intermediate frequency component $f_i$ to a coaxial terminal 65 and a strip line 67 forming a closed circuit for said intermediate frequency component $f_i$ are provided onto the same dielectric base plate 61 by means of printing circuit and the whole member is inserted in the waveguide in the same manner as explained in the previous simple embodiment.

In this modified embodiment, each of the semiconductor element 63, 63′, 63″ shares the high frequency input so that each element carries less high frequency input and thus the intermodulation may be avoided.

In the embodiments shown in FIGS. 11 and 12, three strip lines each having the antenna functions are shown, however, the present invention is not limited to a particular number of the antennas.

The embodiment shown in FIG. 11 may further be modified to provide a number of dielectric rods opposite to respective strip lines 52, 52′, 52″ as shown in a manner in FIG. 10 to adjust effective length of each strip line as an antenna. It is also possible to provide each dielectric resonator on the dielectric base plate adjacent to the respective strip lines 52, 52′, 52″ to arrange each strip line not to respond to an idler frequency.

Various modifications and alterations are possible which lies in the scope of the present invention substantially mentioned in the appended claims.

What is claimed is:

1. A waveguide component for use as a frequency down converter comprising on a dielectric base plate by printing circuit;

a first strip line having antenna function for resonating for at least two electromagnetic waves having different frequencies, a non-linear semiconductor element of which one terminal is connected to one end of said first strip line, a second strip line connected to the other end of the first strip line and having both ends connected to E surfaces of the waveguide, a third strip line having wider width of which one end is connected to the other terminal of said semiconductor element, and a fourth strip line connected between the other end of the third strip line and a center conductor of a coaxial terminal, wherein the dielectric base plate being mounted in the waveguide in a manner that the direction of the first strip line extends parallel to a direction of high frequency electric field in the waveguide.

2. A waveguide component as claimed in claim 1, wherein a plurality of circuit elements, each comprising elements corresponding to said first strip line having the antenna function and the semiconductor element connected thereto, are provided in parallel between said second strip line and said wider width third strip line.

3. A waveguide component for use as a frequency multiplier comprising on dielectric base plate by printing circuit;

a first strip line having antenna function for resonating at least two electromagnetic waves having different frequencies, a non-linear semiconductor element of which one terminal is connected to one end of said first strip line, and a short strip line for connecting the other end of the semiconductor element to one wall of the waveguide, wherein said dielectric base plate being arranged in a manner that the direction of the first strip line extends parallel to a direction of high frequency electric field in the waveguide.

4. A waveguide component as claimed in claim 3, wherein a plurality of circuit elements, each consists of elements corresponding to said first strip line and the semiconductor element of which one terminal is connected to the strip line and said short strip line, are provided on the dielectric base plate by printing circuit.

5. A waveguide component as claimed in claim 4, wherein a plurality of dielectric resonators are arranged each adjacent to the circuit element corresponding to the first strip line so that an equivalent circuit of the dielectric resonator is equivalently inserted in respective strip line having the antenna function.

6. A waveguide component as claimed in claim 4, wherein a plurality of dielectric rods are provided by penetrating a wall of the waveguide in a manner that each end of said dielectric rod is oppositely arranged to each end portion of the strip line having the antenna function wherein the dielectric rods are movably arranged to adjust effective length of the each strip line as antenna by changing the interval.

* * * * *